(12) United States Patent
Wade et al.

(10) Patent No.: US 9,719,591 B2
(45) Date of Patent: Aug. 1, 2017

(54) CONTINUOUSLY VARIABLE TRANSMISSION COOLING FAN

(71) Applicant: Deere & Company, Moline, IL (US)

(72) Inventors: Jeremie A. Wade, Haw River, NC (US); Nathan Yolitz, Horicon, WI (US); Hany K. Nakhla, Durham, NC (US); Shankar Narayana, Cary, NC (US)

(73) Assignee: DEERE & COMPANY, Moline, IL (US)

( * ) Notice: Subject to any disclaimer, the term of this patent is extended or adjusted under 35 U.S.C. 154(b) by 106 days.

(21) Appl. No.: 14/925,717

(22) Filed: Oct. 28, 2015

(65) Prior Publication Data

US 2017/0045134 A1   Feb. 16, 2017

Related U.S. Application Data

(63) Continuation-in-part of application No. 14/824,582, filed on Aug. 12, 2015.

(51) Int. Cl.
*F16H 57/04* (2010.01)
*F04D 29/32* (2006.01)
*F04D 19/00* (2006.01)
*F04D 29/28* (2006.01)
*F04D 17/16* (2006.01)
*F04D 25/02* (2006.01)
(Continued)

(52) U.S. Cl.
CPC ......... *F16H 57/0489* (2013.01); *F04D 17/16* (2013.01); *F04D 25/02* (2013.01); *F04D 27/004* (2013.01); *F04D 29/281* (2013.01); *F04D 29/30* (2013.01); *F16H 57/0416* (2013.01)

(58) Field of Classification Search
CPC ............. F16H 57/0489; F16H 57/0416; F04D 19/002; F04D 17/16; F04D 29/281; F04D 29/327; F04D 25/02; F04D 27/004
See application file for complete search history.

(56) References Cited

U.S. PATENT DOCUMENTS 1,207,242 A   12/1916   Turner
2,842,974 A   7/1958   Neumann
(Continued)

FOREIGN PATENT DOCUMENTS

EP   2282081 A1   2/2011
JP   2006029486 A   2/2006

OTHER PUBLICATIONS

British Search Report in foreign counterpart application GB1612660.9 dated Jan. 12, 2017 (4 pages).
(Continued)

*Primary Examiner* — William E Dondero
*Assistant Examiner* — Robert T Reese

(57) ABSTRACT

A continuously variable transmission cooling fan includes a moveable sheave cover attached to a drive clutch assembly of a continuously variable transmission, with a plurality of fan blades molded into the moveable sheave cover and arranged around the perimeter of the moveable sheave cover. Each fan blade may have a different length, curvature and angle of position than the adjacent fan blades. The continuously variable transmission cooling fan also may include a plurality of openings in the moveable sheave cover located radially inwardly from the fan blades.

12 Claims, 3 Drawing Sheets

(51) Int. Cl.
  *F04D 27/00* (2006.01)
  *F04D 29/30* (2006.01)

(56) References Cited

U.S. PATENT DOCUMENTS

| | | |
|---|---|---|
| 3,943,785 A | 3/1976 | Percifield |
| 4,493,677 A | 1/1985 | Ikenoya |
| 4,531,928 A | 7/1985 | Ikenoya |
| 4,671,782 A | 6/1987 | Ochiai et al. |
| 4,697,665 A | 10/1987 | Eastman et al. |
| 4,708,699 A | 11/1987 | Takano et al. |
| 5,976,044 A | 11/1999 | Kuyama |
| 6,176,796 B1 | 1/2001 | Lislegard |
| 6,267,700 B1 | 7/2001 | Takayama |
| 6,938,508 B1 | 9/2005 | Saagge |
| 7,070,527 B1 | 7/2006 | Saagge |
| 7,281,596 B2 | 10/2007 | Fukuda |
| 7,363,999 B2 | 4/2008 | Hastings |
| 8,439,141 B2 | 5/2013 | Bessho et al. |
| 8,776,930 B2 | 7/2014 | Tadych et al. |
| 8,911,312 B2 | 12/2014 | Itoo et al. |
| 2006/0270503 A1 | 11/2006 | Suzuki et al. |
| 2007/0219030 A1 | 9/2007 | Ho |
| 2009/0298627 A1 | 12/2009 | Johnson et al. |
| 2013/0004329 A1* | 1/2013 | Shiraichi ............... F04D 29/282 416/243 |
| 2014/0033996 A1 | 2/2014 | Sajdowitz |
| 2014/0235390 A1 | 8/2014 | Urbanek |
| 2014/0301828 A1* | 10/2014 | Aiello ................... F04D 17/16 415/111 |
| 2015/0159667 A1* | 6/2015 | Tsai ....................... F04D 17/16 417/354 |
| 2015/0300368 A1* | 10/2015 | Hsu ........................ F04D 17/16 415/108 |

OTHER PUBLICATIONS

British Search Report in foreign counterpart application GB1612664.1 dated Jan. 13, 2017 (4 pages).

* cited by examiner

CONTINUOUSLY VARIABLE TRANSMISSION COOLING FAN

This application is a continuation-in-part of prior application Ser. No. 14/824,582, filed Aug. 12, 2015.

FIELD OF THE INVENTION

This invention relates to continuously variable transmissions for recreational or off road utility vehicles, and specifically to continuously variable transmission cooling fans.

BACKGROUND OF THE INVENTION

Continuously variable transmissions (CVTs) used in recreational or off road utility vehicles use rubber belts to transmit torque between a drive clutch, or primary clutch, and a driven clutch, or secondary clutch. CVT belts are typically V-belts that are expected to remain in contact with the V-belt pulleys of the drive and driven clutches. Some CVTs have "loose" V-belts that are not pre-tensioned between the two clutches while in a static state. Under certain conditions, "loose" V-belts may lose contact with the driven clutch. More specifically, when a CVT belt is used under high load conditions at the CVT's lowest drive ratio, including initial starts or hill climbing, for example, the drive clutch may clamp onto the belt and tension only one side of the belt between the drive and driven clutches. With high tension on only one side of the CVT belt, the belt may slip on the driven clutch. When the slipping stops and the CVT belt engages the drive clutch, a ripple or wave may appear in the un-tensioned side of the belt. Slack in the un-tensioned side of the belt may increase or amplify the ripple or wave so much that the belt may lose contact momentarily with the driven clutch. Even brief loss of engagement or contact of the belt with the driven clutch allows the transmission and driveline to release stored torsional stress and rotate opposite of the drive clutch. This may result in torque spikes when the primary clutch re-engages the belt, and the torque spikes transfer through the transmission and cause undesirable vehicle performance at the lowest drive ratio, such as shuddering or jerking. There is a need for a CVT with a "loose" belt that maintains contact with a driven clutch at low drive ratios and improves vehicle performance during initial starts, hill climbs, and other high load conditions.

In the past, cooling fans have been proposed to keep CVT belts cool in order to improve their durability. However, CVT cooling fans produce substantial noise that may be undesirable or unsatisfactory to drivers of off-road utility vehicles. There is a need for CVT cooling fan that reduces or minimizes air noise and provides better cooling of the drive clutch, driven clutch and belt of the continuously variable transmission.

SUMMARY OF THE INVENTION

A continuously variable transmission cooling fan includes a plurality of fan blades molded into a sheave cover, each fan blade having a different length, curvature, and angle of position than each adjacent fan blade. A plurality of openings in the sheave cover are provided between the fan blades and a center axis of the sheave cover to provide an air passage into the drive clutch assembly. The continuously variable transmission cooling fan reduces or minimizes air noise and improves cooling of the drive clutch, driven clutch and belt of the continuously variable transmission.

DESCRIPTION OF THE PREFERRED EMBODIMENT

Figure 1:
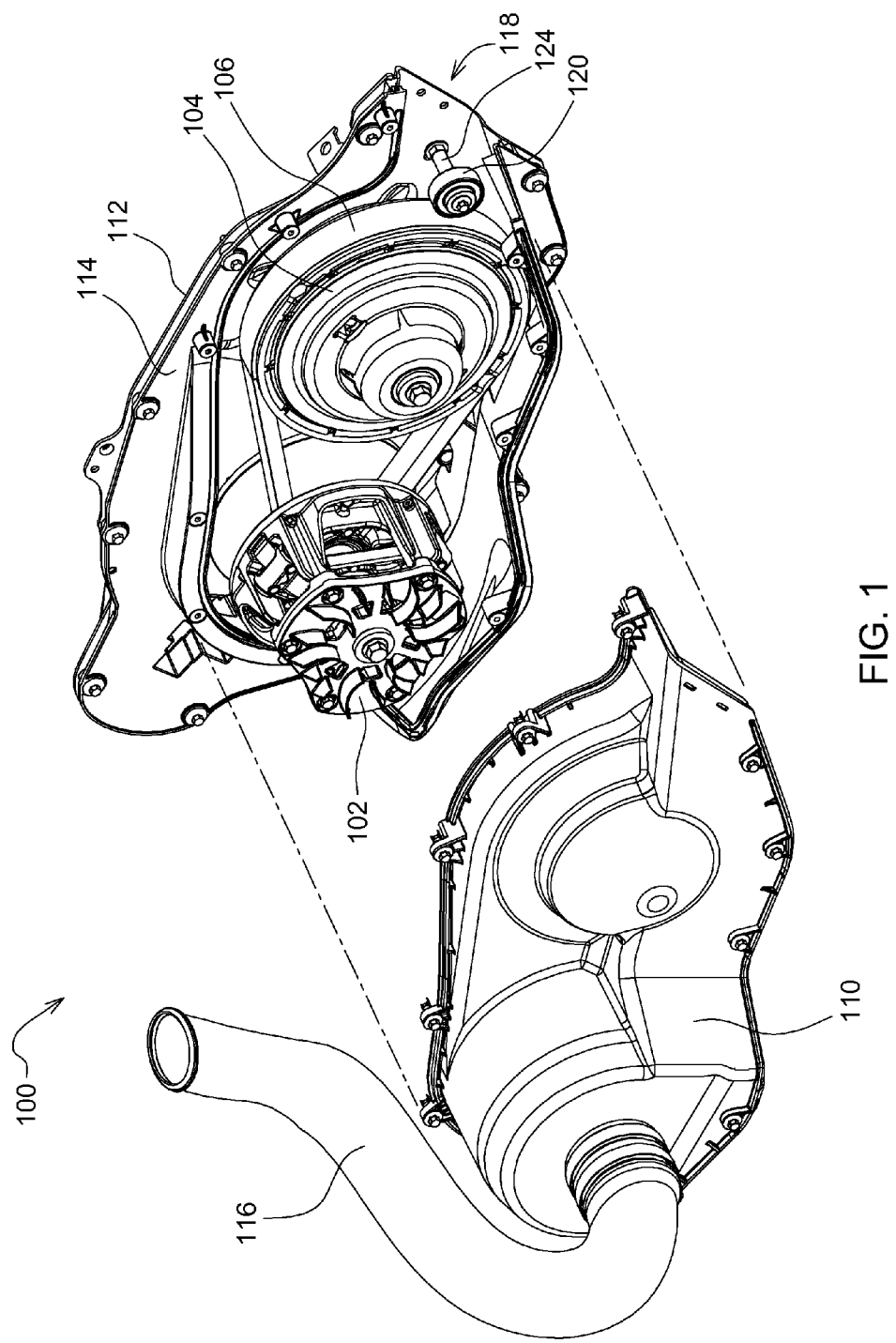
FIG. 1 is a partially exploded perspective view of a continuously variable transmission with a belt guide according to a first embodiment of the invention.
Figure 2:
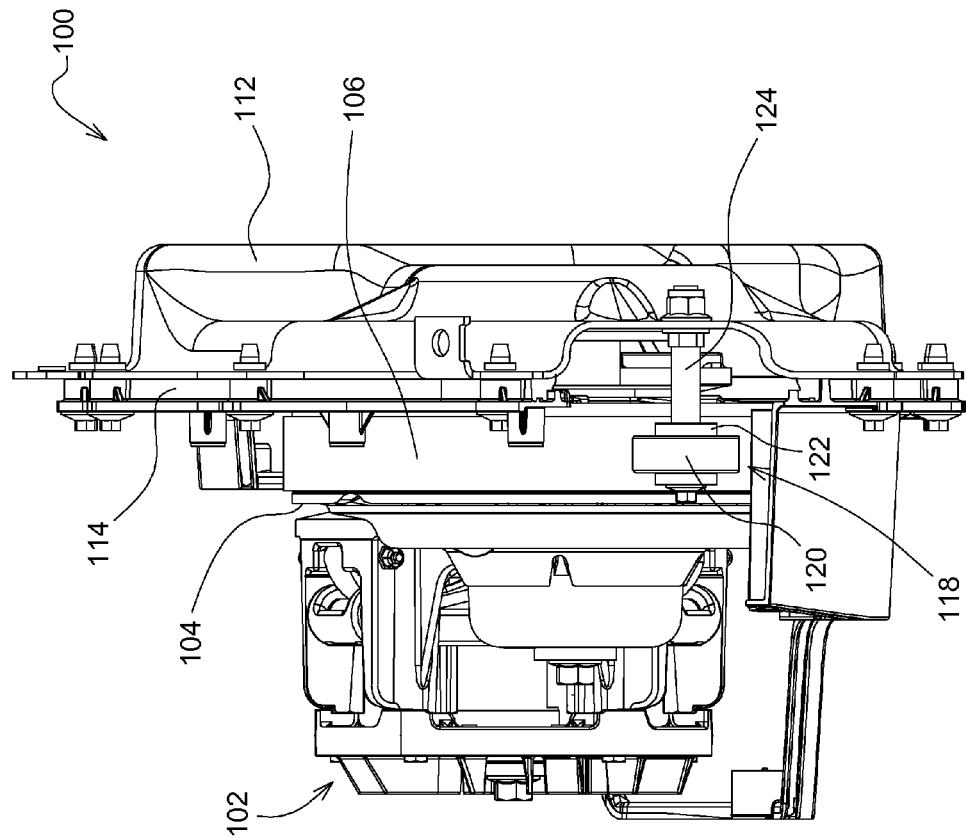
FIG. 2 is an end view of a continuously variable transmission with a belt guide according to a first embodiment of the invention.

FIGS. 1-2 show continuously variable transmission (CVT) 100 on a recreational or off-road utility vehicle. The CVT may include drive clutch assembly 102, also referred to as a primary clutch, and driven clutch assembly 104, also referred to as a secondary clutch. Each of the drive and driven clutch assemblies include a pulley that is split perpendicular to the axis of rotation. The CVT may be changed to any drive ratio between a lowest drive ratio and a highest drive ratio by moving the two sheaves of one pulley closer together and the two sheaves of the other pulley farther apart. CVT belt 106 may be a "loose" belt that is not pre-tensioned between the drive and driven clutches. The CVT belt also may be referred to as a V-belt because it has a V-shaped cross section so that it may ride higher on one pulley and lower on the other when it is around the drive and driven clutch assemblies.

In one embodiment, the drive and driven clutch assemblies of the CVT may be enclosed and supported by outer cover 110, back plate 112 and intermediate cover 114. The outer cover, back plate and intermediate cover may be secured together by threaded fasteners or clips to form a CVT housing. Air intake tube 116 may be connected to the CVT housing for providing cooling air to the CVT belt and clutches. Drive clutch assembly 102 also may include fins that rotate with the drive clutch assembly to draw air in through the air intake tube to the CVT housing.

In one embodiment, CVT belt guide 118 may be positioned inside the CVT housing next to the driven clutch assembly. The CVT belt guide may include bearing 120 which may contact the CVT belt at the CVT's lowest drive ratio. The bearing may be any circular, cylindrical or roller shaped part, or bushing, that bears friction and is rotatable on an axis parallel to the drive and driven clutches. The bearing is positioned in close proximity with the CVT belt, and may rotate if contacted by the CVT belt. For example, the bearing's outer surface may be located between about 0 mm and about 2 mm from the V-belt when the V-belt is at the outer or maximum circumference of the driven clutch assembly. When the CVT belt guide contacts and rotates with the CVT belt, the CVT belt guide prevents any ripples or waves in the slack portion of the belt from losing contact with the driven clutch assembly at low drive ratios.

In one embodiment, CVT belt guide 118 may include one or more bushings 122 on a first end of guide post 124. The bushings may provide shoulders on each side of bearing 120 to locate the bearing in a rotatable position aligned with the V-belt on the driven clutch. Guide post 124 may include a base that is mounted and secured to the CVT housing, and specifically to back plate 112.

Figure 3:
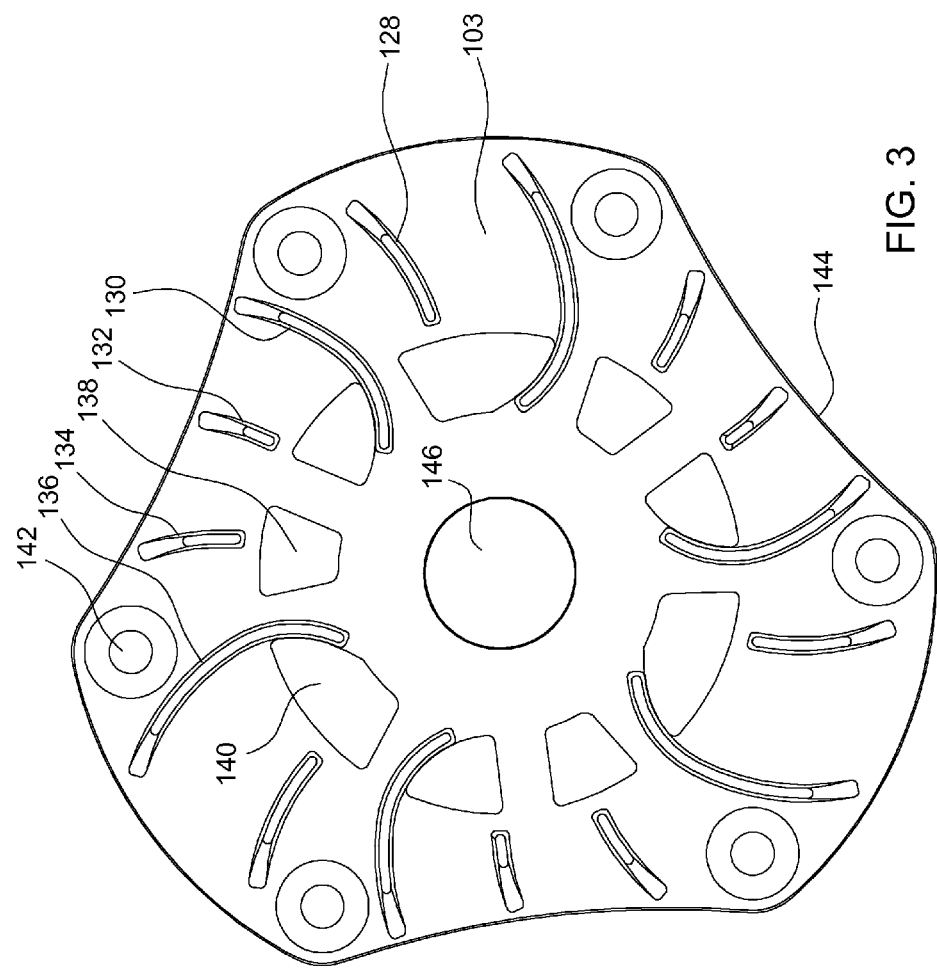
FIG. 3 is a side view of a continuously variable transmission cooling fan according to a first embodiment of the invention.

FIG. 3 shows continuously variable transmission cooling fan according to an embodiment of the present invention. The continuously variable transmission cooling fan may include a plurality of fan blades 130, 132, 134, 136, 138 arranged around and molded into the perimeter of moveable sheave cover 103 on drive clutch assembly 102. The continuously variable transmission cooling fan also may include a plurality of openings 138, 140 located radially inwardly from the fan blades, between the fan blades and the center rotational axis 146 of the moveable sheave cover. The moveable sheave cover including fan blades and openings may be a one piece casting attached to the drive clutch assembly with threaded fasteners through holes 142. The fan blades may draw air through air intake tube 116, through the openings in the moveable sheave cover, and into and throughout the CVT enclosure or housing.

In one embodiment, the continuously variable transmission cooling fan may include fan blades 130, 132, 134, 136, 138 that are dimensioned and arranged to reduce or minimize air noise while maintaining a geometrically balanced fan. Each fan blade may be curved and have a different shape than each adjacent fan blade, thereby substantially reducing air noise from the fan. More specifically, each fan blade may have a different length, curvature, and angle of position than the adjacent fan blades.

In one embodiment, the continuously variable transmission cooling fan may have a plurality of sets of fan blades molded into the sheave cover, with each fan blade in a set may have a different length, curvature, and angle of position. For example, the continuously variable transmission cooling fan may include a five-blade set of fan blades that may be repeated three times around the perimeter of the moveable sheave cover. Each fan blade may have a different length than the other blades in the five-blade set. For example, at least one fan blade may be more than twice as long as another fan blade in the set. Additionally, at least one of the fan blades in each set may have an end or tip that is positioned radially closer to the sheave cover's center axis, compared to the other fan blades in the five-blade set. Each fan blade may be curved, with a different radius of curvature than the other blades in the five-blade set. Each fan blade also may be offset from adjacent fan blades in the five-blade set at a different angle. Additionally, at least one and preferably two fan blades 130, 136 in each five-blade set may have compound, tangent curves from the outer perimeter toward the center axis of the moveable sheave cover. For example, fan blades 130 and 136 may have a larger radius of curvature near the outer perimeter of the moveable sheave cover, and a smaller radius of curvature toward the center axis of the moveable sheave cover.

In one embodiment, the continuously variable transmission cooling fan may include a plurality of openings 138, 140 in the sheave cover, radially inwardly from the fan blades, between the fan blades and the center axis of the moveable sheave cover. The openings allow intake air to pass through the drive clutch assembly to provide better cooling on the sheaves of the drive clutch. The openings may be formed within the profile of the fan blades. Two or more of the openings may have different shapes.

In one embodiment, the continuously variable transmission cooling fan may rotate as part of the moveable sheave cover of the drive clutch assembly. The fan blades create negative pressure to draw air through the intake tube and into the CVT enclosure, through the openings in the moveable sheave cover and into the drive clutch assembly. The continuously variable transmission cooling fan also may direct air flow through the rest of the CVT enclosure before exhausting the hot air through the enclosure exit.

Having described the preferred embodiment, it will become apparent that various modifications can be made without departing from the scope of the invention as defined in the accompanying claims.

The invention claimed is:

1. A continuously variable transmission cooling fan, comprising:
   a plurality of fan blades molded into a sheave cover, each fan blade having a different length, curvature, and angle of position than each adjacent fan blade; and
   a plurality of openings in the sheave cover between the fan blades and a center axis of the sheave cover.

2. The continuously variable transmission cooling fan of claim 1, wherein the plurality of fan blades are grouped in a plurality of sets that are repeated around the center axis of the sheave cover.

3. The continuously variable transmission cooling fan of claim 1, wherein at least one of the fan blades is more than twice as long as another fan blade.

4. The continuously variable transmission cooling fan of claim 1, wherein at least one of the fan blades has a compound, tangent curve between an outer perimeter of the sheave cover and the center axis.

5. A continuously variable transmission cooling fan, comprising:
   a moveable sheave cover attached to a drive clutch assembly of a continuously variable transmission; and
   a plurality of fan blades molded into the moveable sheave cover and arranged around the perimeter of the moveable sheave cover in a plurality of sets, each fan blade in a set having a different length, curvature and angle of position than the other fan blades in the same set.

6. The continuously variable transmission cooling fan of claim 5, further comprising a plurality of openings in the moveable sheave cover located radially inwardly from the fan blades.

7. The continuously variable transmission cooling fan of claim 5, wherein one of the fan blades in each set has an end positioned radially closer to a center axis of the moveable sheave cover than the other fan blades in the set.

8. The continuously variable transmission cooling fan of claim 5, wherein each set has five blades.

9. A continuously variable transmission cooling fan, comprising:
   a plurality of curved fan blades arranged around a perimeter of a sheave cover attached to a drive clutch assembly; each fan blade having a different shape than each adjacent fan blade; and
   a plurality of openings in the sheave cover between the fan blades and a central opening in the sheave cover providing an air passage into the drive clutch assembly.

10. The continuously variable transmission cooling fan of claim 9, wherein each fan blade has a different length than each adjacent fan blade.

11. The continuously variable transmission cooling fan of claim 9, wherein each fan blade has a different radius of curvature than each adjacent fan blade.

12. The continuously variable transmission cooling fan of claim 9, wherein the fan blades are molded into the sheave cover.

* * * * *